United States Patent [19]
Beall

[11] Patent Number: 5,813,217
[45] Date of Patent: Sep. 29, 1998

[54] ION BEAM THRUST METHOD

[76] Inventor: James C. Beall, 8600 W. Old Ajo Way, Tucson, Ariz. 85735

[21] Appl. No.: 627,360

[22] Filed: Apr. 5, 1996

[51] Int. Cl.$^6$ ............................... B64G 1/00; H05H 1/00
[52] U.S. Cl. ........................... 60/202; 244/172; 244/169; 60/203.1
[58] Field of Search .................................. 60/202, 203.1, 60/200.1, 204, 228; 244/158, 169, 172; 315/111.81

[56] References Cited

U.S. PATENT DOCUMENTS

| | | | |
|---|---|---|---|
| 3,206,925 | 9/1965 | Schiff | 60/203.1 |
| 3,367,114 | 2/1968 | Webb | 60/202 |
| 3,535,880 | 10/1970 | Work et al. | 60/202 |
| 3,537,266 | 11/1970 | Mahadevan et al. | 60/202 |
| 3,552,125 | 1/1971 | Banks et al. | 60/202 |
| 3,891,160 | 6/1975 | Minovitch | 244/172 |
| 4,028,579 | 6/1977 | King | 313/361 |
| 4,209,703 | 6/1980 | Delcroix et al. | 250/423 |
| 4,899,084 | 2/1990 | Post | 315/111 |
| 5,007,348 | 4/1991 | Pinson | 102/501 |
| 5,146,742 | 9/1992 | Iida et al. | 60/202 |
| 5,305,974 | 4/1994 | Willis | 244/172 |
| 5,369,953 | 12/1994 | Brophy | 60/202 |
| 5,489,312 | 2/1996 | Willis | 244/172 |

FOREIGN PATENT DOCUMENTS 9007450   7/1990   WIPO .................................. 244/172

*Primary Examiner*—Timothy Thorpe
*Assistant Examiner*—Ted Kim
*Attorney, Agent, or Firm*—Gene Scott-Patent Law & Venture Group

[57] ABSTRACT

A method for providing thrust to a space borne vehicle uses an ion beam current to deliver a continuous stream of mass to the vehicle. The mass stream is decelerated thereby transferring its momentum to the vehicle as thrust. The vehicle reaccelerates the mass stream projecting it back to it origin, and thus receives further thrust in reaction to the departing mass stream. The mass stream may be set up between two particle beam accelerators so that thrust is realized by both accelerators, or the beam may be merely received continuously by one accelerator. In both cases the thrust may be used for deep space acceleration to high velocities by a vehicle not carrying fuel or propellant and not near any natural energy source.

4 Claims, 4 Drawing Sheets

ION BEAM THRUST METHOD

BACKGROUND OF THE INVENTION

1. Field of the Invention

This invention relates generally to propulsion systems for vehicles in empty space, and more particularly to an improved ion exchange, momentum transfer method for continuously, or intermittently changing the relative acceleration vectors between two or more ion beam accelerators.

2. Description of Related Art

Ion accelerators are known for their use by NASA in experiments on deep space drive systems. Particle beam weapons are known also in both the U.S. and the Soviet literature. Ion beam formation and acceleration methods are also very well known in terrestrial materials research and in production environments in the preparation of thin film coatings and ion implantation techniques for doping surfaces, etc. Processes such as ion beam sputtering find widespread use today in both science and industry. In all of these applications ion beam creation, focusing, accelerating, smoothing and directing (targeting) have been brought to an advanced state of the art. Ion beam technology that could be adapted for use in the present invention is expressed in the following references: Webb U.S. Pat. No. 3,367,114 teaches the construction and method of arranging a plurality of ion engines to form a cluster. More particularly, it teaches how to arrange a group of ion engines into a cluster for use on a spacecraft, so as to increase the efficiency and control of the group of ion engines. In the more demanding space missions for spacecraft, that is, for missions beyond the moon, it is planned to use ion engines to propel the spacecraft. However, one ion engine cannot, by itself, develop sufficient thrust for the mission. It is therefore necessary to use a group of ion engines to provide the required thrust. This group of ion engines is normally called a cluster. In forming the cluster, it has been customary to position the ion engines in a side-by-side relationship, generally in the same plane. This is much like a bank of flood lights that are positioned to illuminate an area. With a cluster of the above type, there is a problem of efficiency. Banks, et al. U.S. Pat. No. 3,552,125 discloses an invention which provides an electrostatic ion thrustor with a single grid accelerator system having a capability of electrically orienting the thrust vector. The invention is particularly concerned with such a system to enable a single thrustor to apply yaw, pitch and roll forces or torques on a spacecraft. Work, et al. U.S. Pat. No. 3,535,880 discloses an invention relating to an ion engine of the type wherein thrust is obtained by emitting an ion beam passing through a deflection electrode. This electrode comprises first and second conductive members positioned on opposite sides of the ion beam and extending in the direction of the ion beam for a predetermined distance. The direction of the thrust of the ion engine is altered by applying push-pull deflection potentials to the first and second members in order to deflect the ion beam to a desired angle. Third and fourth conductive members may also be added and arranged with the first and second members as sectors of a circle around the ion beam so as to provide deflection of the ion beam along an axis extending between respective opposite members when separate push-pull potentials are applied. Mahadevan et al., U.S. Pat. No. 3,537,266 discloses an invention which produces a multiplied intense beam of fast neutral atoms for the purpose of space propulsion from ion streams produced by a conventional ion engine. The propellant beam of neutral atoms is formed by successive, symmetrical, resonant, charge transfer of positive ions in a uniform parent gas environment in a uniform electric field. Slow positive product ions and fast moving neutral atoms are created and multiplied through successive charge transfer between ions in the ion streams and the thermal gas atoms. King, U.S. Pat. No. 4,028,579 discloses a high current density ion source with high total current, achieved by individually directing the beamlets from an electron bombardment ion source through screen and accelerator electrodes. The openings in these screen and accelerator electrodes are oriented and positioned to direct the individual beamlets substantially toward a focus point. Delcroix, et al., U.S. Pat. No. 4,209,703 discloses a plasma source constituting an ion accelerator operating in the presence of an intense magnetic induction field for obtaining plasma of large transverse section and comprising a chamber having an inlet for gas and a device to produce electrical discharge at high frequency in the chamber to form a plasma from the gas. A plurality of parallel channels are disposed in axial extension from the chamber and a magnetic induction coil surrounds the channels for producing the intense magnetic induction in a direction parallel to the channels. Post, U.S. Pat. No. 4,899,084 discloses an invention which provides an accelerator for ions and charged particles. The plasma is generated and confined in a magnetic mirror field. The electrons of the plasma are heated to high temperatures. A series of local coils are placed along the axis of the magnetic mirror field. As an ion or particle beam is directed along the axis in sequence the coils are rapidly pulsed creating a space charge to accelerate and focus the beam of ions or charged particles. Iida, et al., U.S. Pat. No. 5,146,742 discloses an ion thrustor which is operable in an interplanetary space with plasma generated by microwaves in a propellant atmosphere. A vessel defines first, second and third hollow spaces and a window between the first hollow space and the second and the third hollow spaces, the second hollow space having an opening. A microwave generating unit generates the microwave in the first hollow space as a standing wave penetrating into the second and third spacers hollow. A propellant supplying unit supplies the propellant into the second and third hollow spaces, the propellant serving as a main and neutralizing propellant and absorbing the standing wave to produce main plasma comprising main ions and main electrons. An accelerating unit accelerates only the main ions into an ion beam to inject the ion beam through the opening into the interplanetary space. A neutralizing unit defines a third space which is in communication to the first space and into which the standing wave penetrates. The propellant comes into the third space to produce neutralizing ions and electrons. The ions are pulled by the ion beam to leave the neutralizing electrons, which neutralize the vessel. Brophy, U.S. Pat. No. 5,369,953 discloses an apparatus for an ion engine comprising a three-grid accelerator system with the decelerator grid biased negative of the beam plasma. This arrangement substantially reduces the charge-exchange ion current reaching the accelerator grid at high tank pressures, which minimizes erosion of the accelerator grid due to charge-exchange ion sputtering, known to be the major accelerator grid wear mechanism. An improved method for life testing ion engines is also provided using the disclosed apparatus. In addition, the invention can also be applied in materials processing. Willis, U.S. Pat. No. 5,489,312 discloses a propulsion system for spaceships wherein a first electromagnetic projectile launcher accelerates "smart" projectiles into space and on appropriate trajectories to rendezvous with a distant spaceship at some later time. The smart projectiles stabilize themselves in space using a system of on board thrustors operated by computers. The computers determine the proper orientation from Sunsensors for coarse alignment and star maps for fine alignment. Laser beams and radio transmissions are directed at the spaceship and are monitored by sensors aboard the spaceship. Computers on board the spaceship determine any necessary course corrections for the projectiles based upon the spaceship's sensor system. Appropriate commands are radioed to the projectiles which execute the commanded maneuvers to alter their trajectories. The spaceship carries a second electromagnetic projectile launcher and a nuclear-powered electricity generating facility to provide electricity to operate the electromagnetic projectile launcher. The spaceship, the second electromagnetic projectile launcher and the nuclear power facility are all rotated axially about the long axis of the electromagnetic projectile launcher to provide both gyroscopic stabilization and also artificial gravity for the crew of the spaceship. The second electromagnetic projectile launcher is used to catch the projectiles which transfers the momentum of the projectiles to the spaceship thereby accelerating it in the desired direction. Additional acceleration of the spaceship is achieved by again launching the captured projectiles in a direction opposite to the desired direction of motion of the spaceship. The spaceship can be decelerated in a similar manner. Mars can be reached in two months using this system.

Robert C. Willis, in his paper entitled *Spaceship Propulsion By Momentum Transfer*, dated Jul. 26, 1994 teaches the feasibility of using the transfer of objects in free space for the propulsion of vehicles. The objects, according to Willis, must be transferred with smart navigation equipment on board in order to dock with the moving vehicle so as to avoid collisions. Also, the transferred objects are useful only for linear movements starting and stopping at least once from a zero relative velocity within each linear movement, so that they cannot be returned to their origin without expending an amount of energy roughly equivalent to that absorbed in capture. It would be considerably more valuable to use an energy stream rather than Willis' mass stream to overcome the need for expending energy in the return path, and to be able to use the stream for accelerating more than one vehicle at a time. It would also be of considerable value to provide a system that could not cause damage with a targeted vehicle upon collision.

The present invention fulfills these needs and provides further related advantages as described in the following summary.

SUMMARY OF THE INVENTION

Generally speaking, the present invention provides certain advantages over present-day, known and demonstrated vehicle drive systems with applications in interplanetary space flight. Additionally, the present invention provides advantages over non-demonstrated theoretical drives such as Willis'. Throughout; the use of "acceleration" or "accelerator"shall be taken as both positive and negative, i.e., including deceleration or decelerator. The present method invention involves a minimum of two independent objects A and B moving in near planetary orbit or in interplanetary free space. Assume that each of the objects carries a particle beam accelerator (PBA 10). A continuous stream of elementary particles, i.e., ions, is caused to be moved between A and B in a closed cycle process. Such a stream is a positively charged current, an ion being merely an atom with at least one net positive electronic charge. Thus, the motion of ions is influenced by electrostatic fields, electrodynamic fields and both static and moving magnetic fields. Since this process is carried out in an ultra-hard vacuum such as in the range below about 10 to the minus 12 torr of free gas particles, the ions, once projected linearly, will continue to move in such a linear path until encountering a gaseous or solid object. As is well known, even in simple hard vacuum environments, such as in the range of 10 to the minus 6 torr of free gas particles, a beam of ions can be caused, electrostatically, to move in straight uninterrupted paths within a range of mean free paths dictated by the level of vacuum. In one embodiment, the object A is meant to be stationary, or relatively so. The object B is meant to be a space vehicle and is meant to have a component of its velocity vector either receding from, or closing with object A. As to whether the invention method provides a (+) or (−) acceleration vector between A and B depends only upon whether A and B are closing or separating at the moment of interest. Object A receives the ion current reflected back from B, turns it by 180 angular degrees, and then reaccelerates the ion current back toward B. B may take the relatively passive role of only receiving the ion current and thus accelerating under its influence, or it may provide further acceleration of the ions. In either role, B may be made to completely absorb the momentum of the ion current or only partly absorb it. B is thereby accelerated by Newton's third law in the same direction that the current was traveling upon arrival at B. At A, at least part of the momentum energy of the arriving ions may be used in a further circuit of the ions. It is clear that for A to operate continuously, it must be positioned near a continually renewable or useful source of energy, such as a star, power station, etc. On the other hand, B may be accelerated through deep space with no supply or source of energy available to it whatsoever. In fact, some or all of the energy absorbed by B from the ion current, could be easily put to useful work aboard the vehicle that is object B. It is quite clear that the amount of energy delivered to B by each ion is dependent upon both the mass and the velocity of the ions. The total energy delivered to B per unit time is thus dependent upon the size of the ion current and its mass.

From a structural standpoint, object A requires a particle accelerator (PBA 10). Such devices are very well known in the literature, and we do not mean to provide inventive elements for these known structures here. PBA 10's when used in circulating systems, such as the present one, require a receiving portion as well as a transmitting portion. These two portions are joined by an intermediary interconnection portion. In at least one embodiment of the present invention, the transmitting portion on the PBA 10 of object B, is simply a directed release point, without means for ion acceleration. In this case, the ion current must make one full circuit after being accelerated by the PBA 10 of object A. The present method teaches the handling of the circulating ion current strictly in accordance with the well known principles of electrostatics and electromagnetics. The method also teaches the use of two independent, spaced apart, side-by-side, and parallel paths for the ions moving in opposing directions respectively, or the use of a coaxial path approach whereby the ions moving in one of the opposing directions moves as a cylinder with a vacant core, while the ions moving in the other of the directions moves within the vacant core of the first ion path.

It is clear from the foregoing, that several combinations are possible with the present inventive approach. For example, we have described the simple case whereby B, a vehicle, is accelerated away from A, a stationary object, such as the Earth's moon. Likewise, A and B, both vehicles with similar masses, could be mutually accelerated away from each other, as for instance, to place them in opposing orbits.

Any number of objects, A, B, C . . . , forming a ring, could be mutually accelerated away from a common central reference point. Finally, a number of independent objects could be accelerated in selected directions depending upon the angular spacing of the objects, as well as their spacing from a common non-movable base object.

One object of the present invention is to provide a space drive method requiring no fuel mass to be carried on board one or more accelerated vehicles. Another object is to provide such a method requiring relatively little mass devoted to propulsion means on board the accelerated vehicle(s). It is thus a specific object of the present invention to provide a space vehicle propulsion method capable of useful and cost effective acceleration, and which provides a very high ratio of useful mass to propulsion mass, about nine orders of magnitude. It is another object of the present invention to provide a drive system which is able to accelerate a space vehicle to extremely high velocities, theoretically limited only by relativistic effects such as mass expansion and such.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a method for providing propulsion to at least one space vehicle, craft or object. In such drawings.

DETAILED DESCRIPTION OF THE PREFERRED EMBODIMENT

Figure 1:
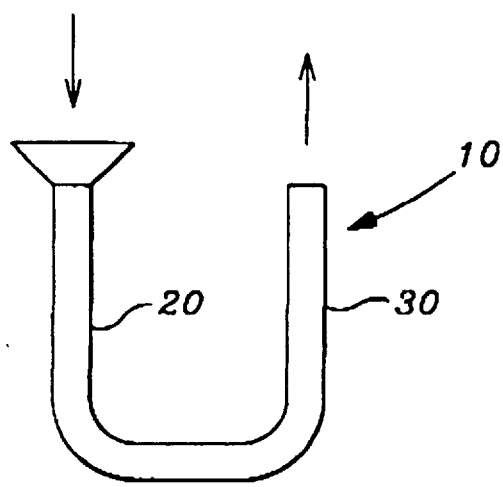
FIG. 1 is a schematic diagram of the side view of a particle beam accelerator of the preferred embodiment of the present invention, particularly showing a receiving portion and a transmitting portion.
Figure 2:
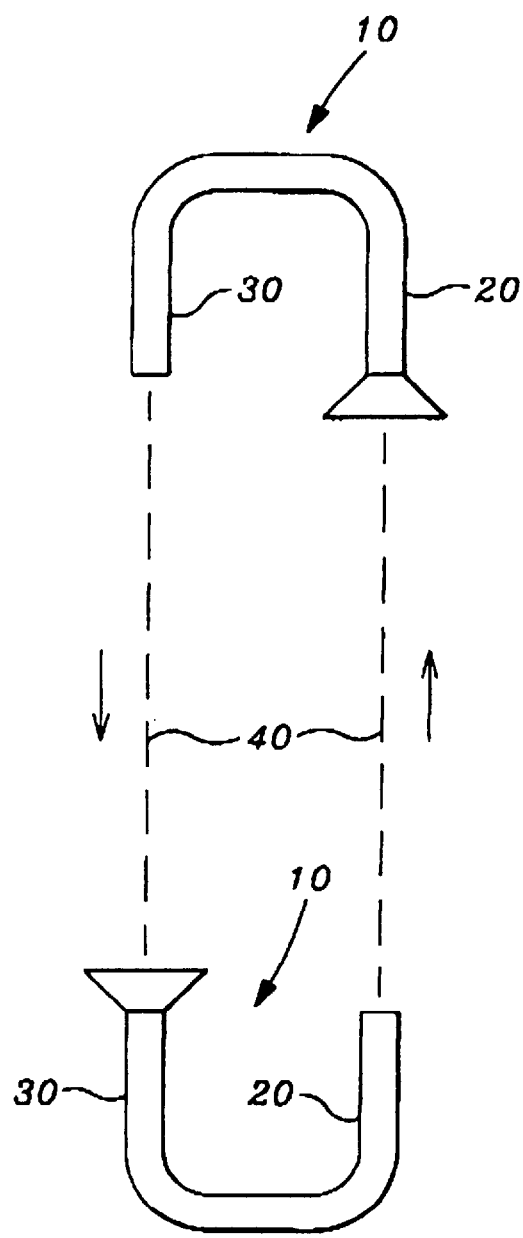
FIG. 2 is a schematic diagram of a pair of particle beam accelerators as shown in FIG. 1, in physical opposition, thereof.
Figure 3:
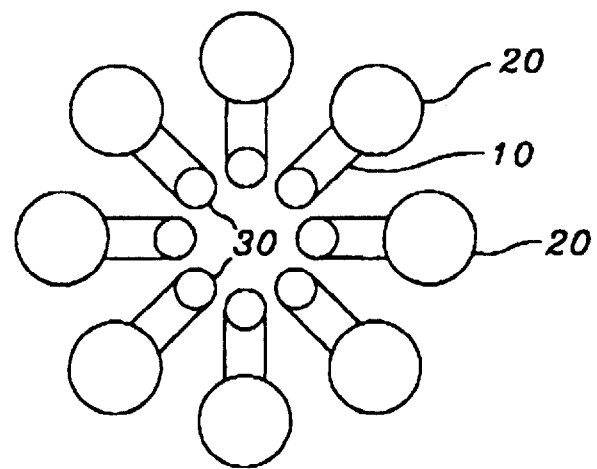
FIG. 3 is a schematic diagram of the front view of a particle beam accelerator array of the preferred embodiment, thereof, particularly showing the manner in which receiving portions of each of the accelerators are aligned and in which transmitting portions are aligned.
Figure 5:
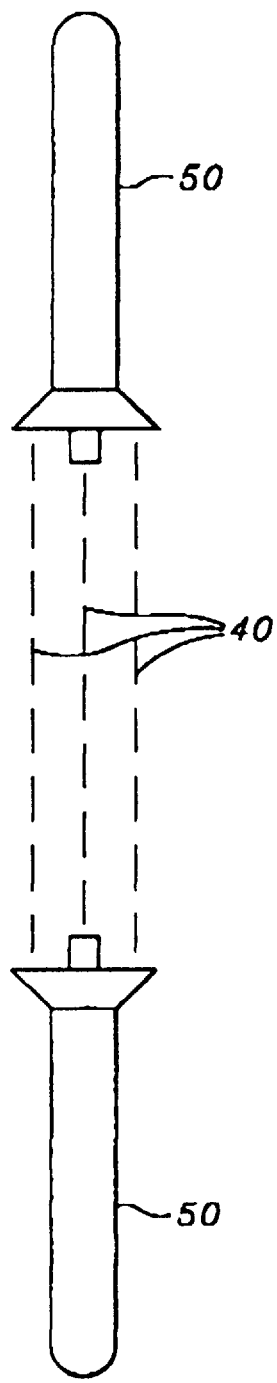
FIG. 5 is a diagram showing the relative positioning of objects in a bimodal vehicle acceleration using the present method.

In the present inventive method for propulsion, an object 50 develops an accelerating force by receiving an ion beam current 40 and reducing the velocity of the ions which make up the current 40. The resultant momentum transfer from the ions to the object 50 results in decelerating forces on the ions, and equal but oppositely directed accelerating forces on the capturing object 50. In one embodiment, the ions reaccelerate back in the direction from which they came, as shown in FIGS. 2 and 5, and this too, results in a further accelerating reaction force on the object 50.

Considering the latter process we know from elementary physics that the thrust developed on an object 50 ejecting mass is given by:

$$F=M*A \qquad 10$$

or equivalently:

$$F=M*V/G \qquad 20$$

wherein: M is the mass of the object 50, assuming that it is constant, i.e., the ejected mass being considered trivial with respect to that of the object 50.

A is the acceleration on the object 50 due to the force F. Again, A is assumed to be a constant since both M and F are.

V is the instantaneous value for velocity of the object.

G is the universal gravitational constant.

when the mass stream is captured and then elastically rebounded we have:

$$F=M*2(V-Vr) \qquad 30$$

wherein: Vr is the relative velocity between the object and the ions.

There is a difference between the actual ion mass M and the apparent ion mass Ma, and this is proportional to the number of cycles traveled by the ions in unit time, i.e. each second. Therefore, we see:

$$Ma=M*Vi/2*D \qquad 40$$

wherein: Vi is the velocity of the ions and, D is the distance of one half cycle.

Combining formulas 30 and 40 yields:

$$F=M*(Vi/2*D)*(2[V-Vr]/G) \qquad 50$$

However, in the case where M is not constant:

$$F=Ms*S*(Vi/2*D)*(2[V-Vr]/G) \qquad 60$$

wherein: Ms is mass absorbed per second, and S is seconds.

Now, Assuming:

$$M=(F\char`\^2)/2 \qquad 70$$

then the increase in distance, given by (V/2*D) is inversely proportional to the increase in ion mass, given by (Ms*S) and a uniform rate of acceleration will occur under constant force. A uniform rate of acceleration is generally desired.

Figure 4:
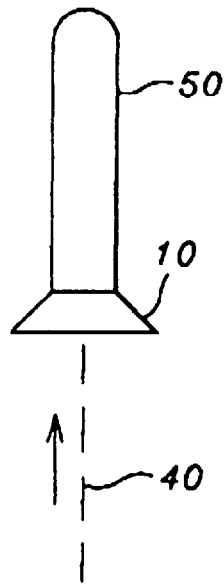
FIG. 4 is a diagram showing the relative positioning of objects in a simple single vehicle acceleration using the present method.

In a first embodiment of the present invention, shown in FIG. 4, an ion propulsion method is taught. This method acts upon an independent space borne object 50 such as a particle beam accelerator (PBA) 10 and includes the steps of: a) generating a collimated, linear ion beam 40; b) directing the ion beam at the space borne PBA 10; and c) capturing the ion beam 40 with the space borne PBA 10 so that the momentum of the ion beam is transferred to the space borne PBA 10 as thrust. In this approach, the ion beam is produced by any such ion generator having an ion accelerator grid and a collimating means so that the resultant beam is linearly directed and targetable. Particle beam weapons are well known in the literature so that producing a beam and directing its flight characteristics in free space are not considered to be a part of the inventive steps included here. However, it is considered to be a critical step of inventorship to provide the basic understanding of how a particle beam may be used for vehicle thrust.

In a second embodiment of the present invention, as shown in FIG. 5, the ion propulsion method, is used for a first independent space borne PBA 10, and a second independent space borne PBA 10. The first and second PBA 10 have a common line of sight. The method comprises the steps of: a) generating a first collimated, linear ion beam with the first PBA 10; b) directing the first ion beam at the second PBA 10; d) capturing the first ion beam with the second PBA 10; e) generating a second ion beam at the second PBA 10; f) directing the second ion beam at the first PBA 10; g) capturing the second ion beam with the first PBA 10; and then h) repeating steps (a) through (g) intermittently or continuously so that momentum transfer between the ion beams 40s and both PBA 10 is converted to thrust on both PBA 10 driving them apart or slowing their mutual approach. The ion beams may be dispatched and received on an intermittent basis whereby the transmission of one beam is completed prior to the retransmission or follow-on transmission of a next beam. Alternately, the beams moving between two independent PBA 10 may exist simultaneously. In one embodiment, the beams move in parallel, spaced apart paths. In an alternate technique one of the ion beams is shaped as a cylinder with a hollow center portion, the other of the beams moves within the hollow center portion of the first of the beam, the beams moving coaxially. This approach has the advantage of negating the need for beam target correction due to rolling motion of an object or vehicle 50 carrying the PBA 10. With only pitch and yaw corrections to be controlled, one axis of control is completely eliminated.

Figure 6:
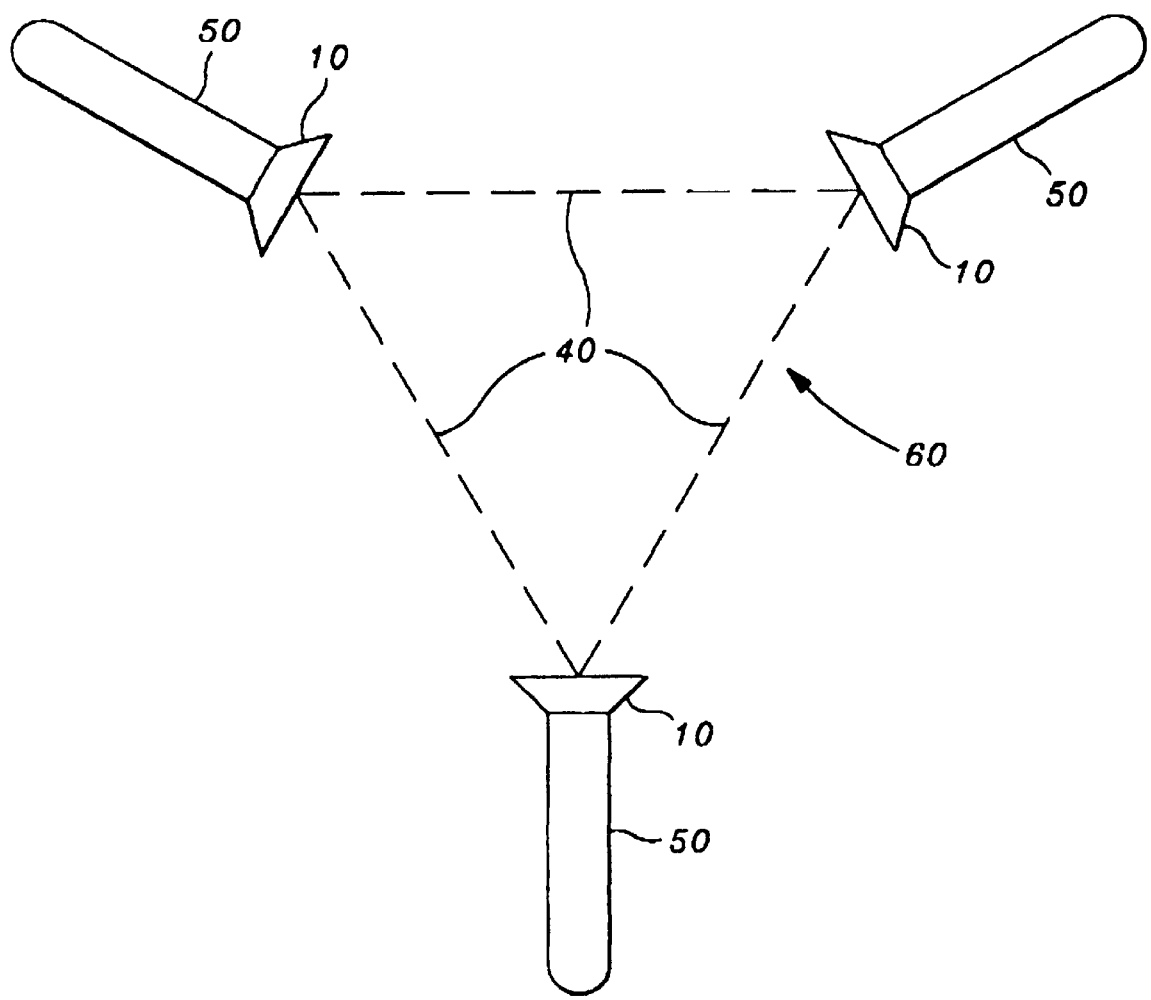
FIG. 6 is a diagram showing the relative positioning of objects in a multimodal vehicle acceleration using the present method.

A third embodiment of the present invention, as shown in FIG. 6, teaches a method for providing thrust to a plurality of independent space borne PBA 10, all of which are spread apart in space with each one of the PBA 10 being positioned at an apex of two sides of a polygon 60. Each of the PBA 10 has two nearest neighbor PBA 10, and it is a requirement that each PBA 10 is on a common line of sight with both of its nearest neighbors. The method includes the steps of: a) generating a collimated, linear ion beam with any one of the PBA 10; b) directing the ion beam at one of its nearest neighbors; d) capturing the ion beam with the one nearest neighbor PBA 10; e) repeating steps (a) through (d) after substituting the one nearest neighbor PBA 10 for the one PBA 10; f) repeating step (e) between each pair of adjacent PBA 10 in turn, until the ion beam has made a full circuit of the polygon 60 moving stepwise in a selected sense from one PBA 10 to the next, then the next, and so on. Here again, the ion beams may be transferred between each pair of PBA 10 neighbors in a stepwise fashion proceeding around the polygon 60, or beams may be transferred between some, or even all, sets of neighbors simultaneously. Further, transmissions may occur intermittently or continuously as desired. In this embodiment, the PBA 10 are all caused to experience acceleration forces in different directions. This can be an advantage, or a disadvantage depending upon the object of a mission. Momentum transfer between the ion beams and the PBA 10 is converted to thrust on the PBA 10 driving said PBA 10 apart or slowing their mutual approach.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An ion propulsion method for a first independent space borne PBA, and a second independent space borne PBA, the first and second PBA being on a common line of sight, the method comprising the steps of:

a) generating a first collimated, linear ion beam with the first PBA;

b) directing the first ion beam at the second PBA;

d) capturing the first ion beam with the second PBA;

e) generating a second ion beam at the second PBA;

f) directing the second ion beam at the first PBA;

g) capturing the second ion beam with the first PBA;

h) repeating steps (a) through (g) intermittently or continuously;

wherein the first and second ion beams move in parallel, spaced apart paths;

whereby momentum transfer between the first ion beam and the second PBA and the second ion beam and the first PBA is converted to thrust on the first and second PBA driving said first and second PBA apart or slowing the mutual approach of said first and second PBA.

2. An ion propulsion method for a first independent space borne PBA, and a second independent space borne PBA, the first and second PBA being on a common line of sight, the method comprising the steps of:

a) generating a first collimated, linear ion beam with the first PBA;

b) directing the first ion beam at the second PBA;

d) capturing the first ion beam with the second PBA;

e) generating a second ion beam at the second PBA;

f) directing the second ion beam at the first PBA;

g) capturing the second ion beam with the first PBA;

h) repeating steps (a) through (g) intermittently or continuously;

wherein the first ion beam is shaped as a cylinder with a hollow center portion, the second ion beam moving within the hollow center portion of the first ion beam, the beams moving coaxially;

whereby momentum transfer between the first ion beam and the second PBA and the second ion beam and the first PBA is converted to thrust on the first and second PBA driving said first and second PBA apart or slowing the mutual approach of said first and second PBA.

3. An ion propulsion method for a first independent space borne PBA, and a second independent space borne PBA, the first and second PBA being on a common line of sight, the method comprising the steps of:

a) generating a first collimated, linear ion beam with the first PBA;

b) directing the first ion beam at the second PBA;

d) capturing the first ion beam at the second PBA;

e) redirecting the first ion beam as a second ion beam at the first PBA;

f) capturing the second ion beam with the first PBA;

g) repeating steps (a) through (g) intermittently or continuously;

wherein the first and second ion beams move in parallel, spaced apart paths;

whereby momentum transfer between the first ion beam and the second PBA and the second ion beam and the first PBA is converted to thrust on the first and second PBA driving said first and second PBA apart or slowing the mutual approach of said first and second PBA.

4. An ion propulsion method for a first independent space borne PBA, and a second independent space borne PBA, the first and second PBA being on a common line of sight, the method comprising the steps of:

a) generating a first collimated, linear ion beam with the first PBA;

b) directing the first ion beam at the second PBA;

d) capturing the first ion beam at the second PBA;
e) redirecting the first ion beam as a second ion beam at the first PBA;
f) capturing the second ion beam with the first PBA;
g) repeating steps (a) through (g) intermittently or continuously;

wherein the first ion beam is shaped as a cylinder with a hollow center portion, the second ion beam moving within the hollow center portion of the first ion beam, the beams moving coaxially;

whereby momentum transfer between the first ion beam and the second PBA and the second ion beam and the first PBA is converted to thrust on the first and second PBA driving said first and second PBA apart or slowing the mutual approach of said first and second PBA.

* * * * *